United States Patent [19]

Schmidlin et al.

[11] Patent Number: 5,038,159

[45] Date of Patent: Aug. 6, 1991

[54] APERTURED PRINTHEAD FOR DIRECT ELECTROSTATIC PRINTING

[75] Inventors: Fred W. Schmidlin, Pittsford; William M. Lindenfelser; John D. Sotack, both of Rochester, all of N.Y.

[73] Assignee: Xerox Corporation, Stamford, Conn.

[21] Appl. No.: 452,159

[22] Filed: Dec. 18, 1989

[51] Int. Cl.[5] .............................................. G01D 15/06

[52] U.S. Cl. ..................................... 346/159; 346/155

[58] Field of Search ...................... 346/155, 159, 160.1, 346/153.1

[56] References Cited

U.S. PATENT DOCUMENTS 3,657,599 4/1972 Kashio .............................. 346/75 X
3,689,935 9/1972 Pressman et al. .............. 346/74 ES
4,491,855 1/1985 Fuji et al. ............................ 346/159
4,568,955 2/1986 Hosoya et al. ................... 346/153.1
4,658,269 4/1987 Rezanka ................................ 346/75

*Primary Examiner*—Benjamin R. Fuller
*Assistant Examiner*—Randy W. Gibson

[57] ABSTRACT

Direct electrostatic printing apparatus including structure for delivering developer or toner particles to a printhead forming an integral part of the printing device. The printhead structure includes control electrodes and a shield electrode structure secured to opposite sides of an insulative base. The radius of the opening of a control electrode is smaller than the radius of a corresponding shield electrode opening resulting in larger peak potentials for controlling toner flow for the same voltage applied to the control electrode of a printhead aperture wherein the control electrode opening is larger than the opening in a corresponding shield electrode opening.

12 Claims, 2 Drawing Sheets

APERTURED PRINTHEAD FOR DIRECT ELECTROSTATIC PRINTING

BACKGROUND OF THE INVENTION

This invention relates to a direct electrostatic printing device and more particularly to an apertured printhead structure utilized for depositing developer or toner in image configuration on plain paper substrates.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of one-component insulative magnetic toner and to record a visible image by the charged particles directly on an image receiving member. Fuji, et al. show an apertured printhead structure having wedge-shaped apertures wherein the larger diameter of an aperture is delineated by a signal or control electrode and is disposed opposite an image receiving substrate.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a tòner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. patent application Ser. No. 07/290,665 filed on Dec. 27, 1988 in the name of Fred W. Schmidlin and assigned to the same assignee as the instant application relates to direct electrostatic printing. The printhead structure therein is constructed such that the control electrodes thereof are disposed opposite the toner supply resulting in reduced control voltage requirements.

BRIEF DESCRIPTION OF THE INVENTION

The present invention provides a developer or toner delivery system disposed to one side of a printhead and an electrically biased shoe or electrode which is disposed to the opposite side of the printhead from the toner delivery system.

The printhead structure comprises a sandwhich-like structure including an insluative base member having control electrodes carried by one side thereof and a shield electrode carried by the other side. Aperture extending through the printhead structure are delimited by circular openings in the control electrodes and corresponding circular openings n the shield electrode and base member. In accordance with the present invention, the openings for the control electrodes have a smaller radius than a corresponding opening in the shield electrode. When used with insulative nonmagnetic toner the printhead structure having the foregoing hole configuration provides significant advantages over that of Fujii et al, in that, toner supply modulation can be achieved with lower switching voltages. Another advantage is the minimization of the accumulation rate of wrong sign toner on the printhead structure. Also, the positioning of the larger diameter of the aperture adjacent the toner supply provides for better toner collection resulting in improved toner flow due to increased toner cloud densities and hence print speed.

DETAILED DESCRIPTION OF THE DRAWINGS

DESCRIPTION OF THE PREFERRED EMBODIMENT OF THE INVENTION

Figure 1:
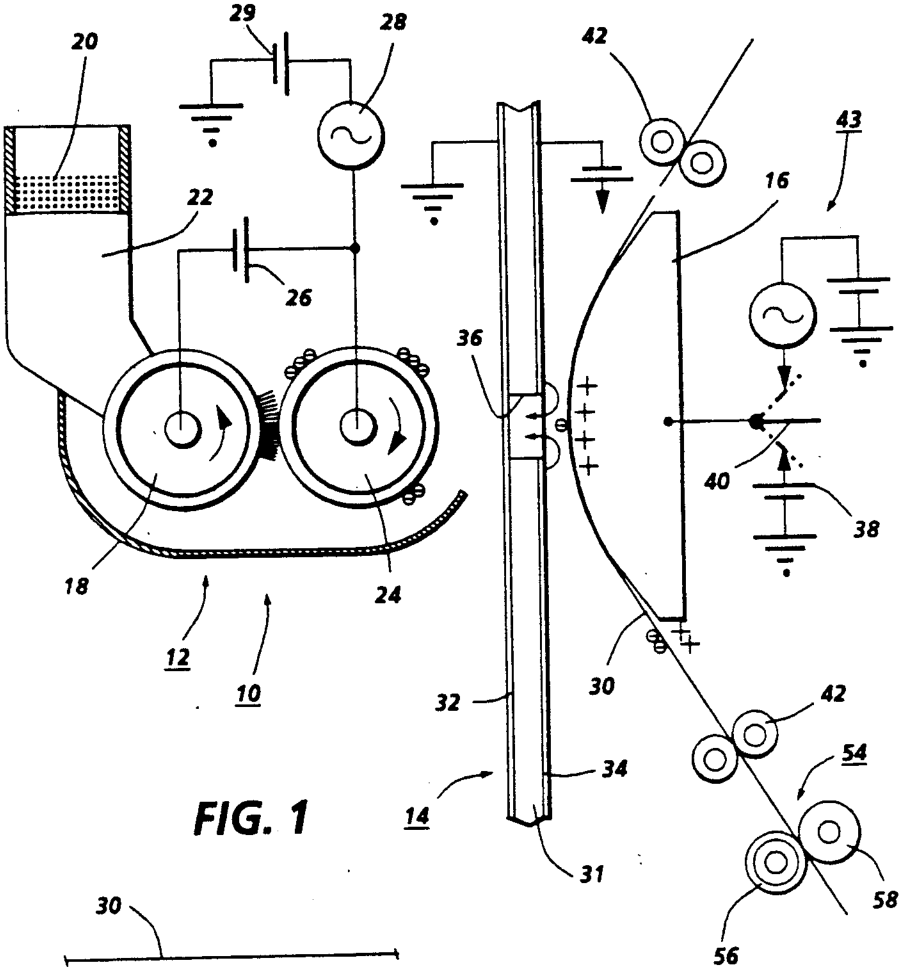
FIG. 1 is a schematic illustration of a printing apparatus representing the present invention.

Disclosed in FIG. 1 is an embodiment of a direct electrostatic printing apparatus 10 representing the invention.

The printing apparatus 10 includes a developer delivery system generally indicated by reference character 12, a printhead structure 14 and a backing electrode or shoe 16.

The developer delivery system 12 includes a conventional magnetic brush 18 supported for rotation adjacent a supply of toner 20 contained in a hopper 22. A developer donor roll 24 is supported for rotation intermediate the magnetic brush 18 and the printhead structure 14. The donor roll structure is coated with Teflon-S (Trademark of E. I. DuPont) is spaced from the printhead approximately 0.003 to 0.015 inch. Teflon-S is a tetrafluoroethylene fluorocarbon polymer that is loaded with carbon black. The magnetic brush has a dc bias of about 200 volts applied thereto via a dc voltage source 26. An AC voltage of about 400 volts at 3 KHz provided by source 28 with a dc bias of 20 volts provided by source 29 is applied to the donor roll 24. The applied voltages are effective to cause transfer of a monolayer of toner from the brush 18 to the donor roll 24. The monolayer is subsequently jumped to the vicinity of the apertures of the printhead. The 20 volts dc bias precludes collection of right sign toner on the shield electrode of the printhead.

The developer preferably comprises any suitable insulative nonmagnetic toner/carrier combination having Aerosil (Trademark of Degussa, Inc.) contained therein in an amount equal to ½% by weight and also having zinc stearate contained therein in an amount equal to 1% by weight. As will be apparent to those skilled in the art, different developers with different amounts of additives require different operating conditions for optimal control of the toner flow.

The printhead structure 14 comprises a layered member including an electrically insulative base member 31 fabricated from a polyimide film approximately 0.001 inch thick. The base member is clad on the one side thereof with a continuous conductive layer or shield 32 of aluminum which is approximately one micron thick. The opposite side of the base member 30 carries segmented conductive layer 34 thereon which is fabricated from aluminum. A plurality of holes or apertures 36, (only one of which is shown) approximately 0.15 mm in diameter are provided in the layered structure in a pattern suitable for use in recording information. The apertures form an electrode array of individually addressable electrodes. With the shield grounded and zero to +50 volts applied to an addressable electrode, toner is propelled through the aperture associated with that electrode. The aperture extends through the base 31 and the conductive layers 32 and 34.

With a negative 300 volts applied to an addressable electrode toner is prevented from being propelled through the aperture. Image intensity can be varied by adjusting the voltage on the control electrodes between 0 and minus 300 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 30 from the printhead deflects the recording medium in order to provide an extended area of contact between the medium and the shoe.

The recording medium 30 may comprise cut sheets of paper fed from a supply tray, not shown. The sheets of paper which are spaced from the printhead 14 a distance in the order of 0.003 to 0.030 inch as they pass therebetween. The sheets 30 are transported in contact with the shoe 16 via edge transport roll pairs 42.

During printing the shoe 16 is electrically biased to a dc potential of approximately 400 volts via a dc voltage source 38.

Periodically, between the printing of successive pages, a switch 40 is actuated in the absence of a sheet of paper between the printhead and the shoe such that a dc biased AC power supply 43 is connected to the shoe 16 to effect cleaning of the printhead. The voltage supplied by the source 43 is of the same frequency as that (i.e. source 28) used to jump the toner from the toner supply system but it is 180 degrees out of phase with it. This causes the toner in the gap between the paper and the printhead to oscillate and bombard the printhead.

Momentum transfer between the oscillating toner and any toner on the control electrodes of the printhead causes the toner on the control electrodes to become dislodged. The toner so dislodged is deposited on the substrates subsequently passed over the shoe 16.

At the fusing station, a fuser assembly, indicated generally by the reference numeral 54, permanently affixes the transferred toner powder images to sheet 30. Preferably, fuser assembly 54 includes a heated fuser roller 56 adapted to be pressure engaged with a back-up roller 58 with the toner powder images contacting fuser roller 56. In this manner, the toner powder image is permanently affixed to copy substrate 30. After fusing, chute, not shown, guides the advancing sheet 30 to a catch tray (not shown) for removal from the printing machine by the operator.

The apertures 36 are delineated by circular openings 70 in the control electrodes and corresponding circular openings 72 in the shield electrode. Openings 76 in the base member provide a toner flow path between the openings 72 and 74. In accordance with the present invention, the radius of an opening 72 in a control electrode is smaller than the corresponding opening in the the shield electrode. Thus, the apertures illustrated in FIG. 2 appear to have a wedge shape.

Figure 2:
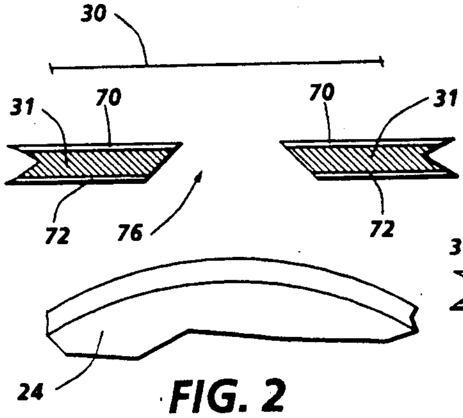
FIG. 2 is an enlarged fragmentary cross sectional view of a printhead aperture according to the invention.
Figure 3:
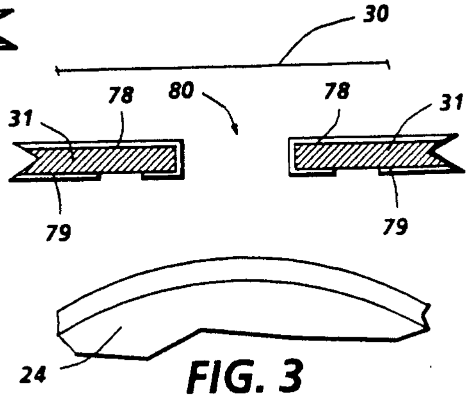
FIG. 3 is an enlarged fragmentary cross sectional view of a modified printhead aperture according to the invention.

A modified printhead aperture configuration as illustrated in FIG. 3 comprises a penetrating control electrode structure 78 and a shield electrode structure 79. By penetrating it is meant that the control electrode extends through the aperture 80 and is partially in contact with the side of the base member occupied by the shield electrode. The radius of the the control electrode opening, through the aperture, is approximately 3 mils and the radius of the portion of the electrode which is secured to the same side of the base member 76 is approximately 4 mils. As can be seen from both FIGS. 2 and 3, the control electrodes openings have a smaller radius than the shield electrode openings and are disposed opposite the toner supply.

Figure 4:
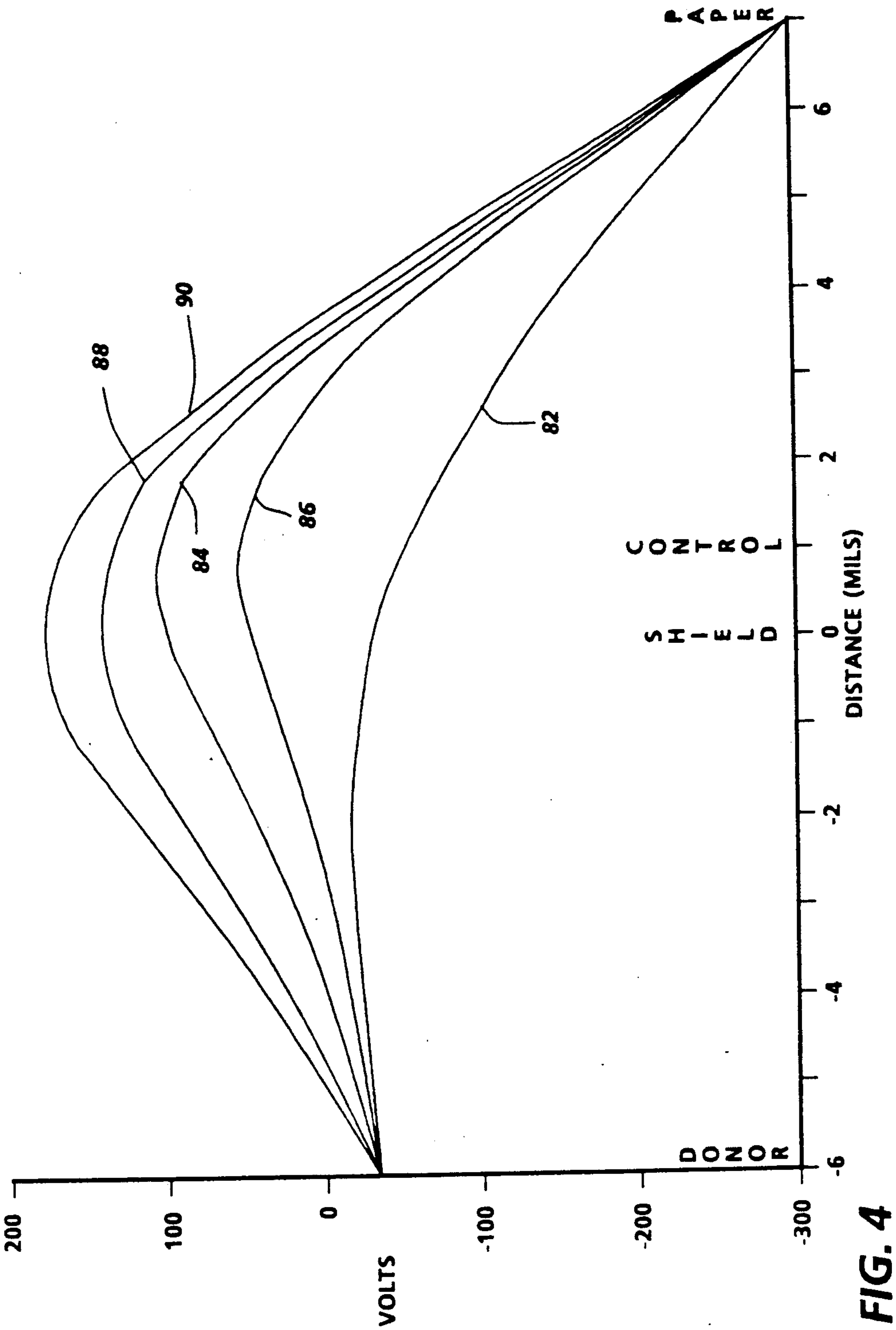
FIG. 4 illustrates plots of the DC component of electrostatic potential versus distance along a path from a toner donor to an imaging substrate through the center of a printhead aperture and perpendicular to the printhead.

FIG. 4 illustrates plots of the DC component of electrostatic potential versus distance along a path from the toned donor 24 to the imaging substrate 30 through the center of a printhead aperture configuration as shown in FIGS. 2 and 3 and perpendicular to the printhead. The plot in FIG. 4 and the discussions to follow relating thereto directly apply to a case where the polarity of the toner is positive. These same plots also apply to negative toner if the sign of the voltage is reversed. Thus, a set of electrode voltages giving rise to a given plot in FIG. 4 will produce the same effect on negative toner if all the electrode voltages are reversed. For example, to produce the same 105 volt barrier illustrated by curve 84 in FIG. 4 for negative toner the control voltage must be changed from +300 to −300 volts. Negative toner was tacitly assumed in all examples discussed hereinabove. The curve 82 represents a toner flow or "On" condition where 0 volts are applied to the control and shield electrodes. The printhead structure for this example is spaced, as indicated in FIG. 3, 6 mils from both the donor roll and the imaging receiving paper and has a total thickness of 1 mil. Also, with 0 volts applied to the control electrode, a −40 volts is applied to the donor roll and −300 volts is applied to the backside of the image receiving surface. The voltages for the donor roll, paper shoe and shield electrode are the same for curves 84, 86, 88 and 90 but the control voltage is set to a +300 volts. The curves 84, 88 and 90 represent typical "OFF" states for the printhead structures of the present invention. Curves 84 and 88 are for an aperture as shown in FIG. 2 while curve 90 is for an aperture structure as shown in FIG. 3. The curve 86 represents the "OFF" state for a prior art printhead aperture configuration. In the case of curves 84, 88 and 90 the radius of the control electrode is smaller than its corresponding shield opening radius whereas in the case of curve 86 the radius of the control electrode is larger than a corresponding shield opening radius or the radii of the shield and control electrodes are the reverse of those for curve 84. For curves 84, 88 and 90 the control electrode opening is 3 mils. The shield radii for curves 84 and 88 are 3.6 and 5.6 mils respectively. For curve 90 the shield radius is 5 mils while the radii of the smaller control electrodes extend from 3 to 4 mils on the shield side of the printhead.

By a comparison of curves 84 and 86, it can be seen that the aperture configuration of the present invention results in a higher peak potential (i.e. voltage which acts as a barrier to toner flow through an aperture) of 105 volts compared to 48 volts for an aperture configuration fabricated in accordance with that known in the prior art where the control opening radius is larger than a corresponding shield opening radius. Thus, a gain of better than 2 to 1 in peak voltage sensitivity is attained by the aperture configuration of the present invention. Accordingly, the same toner flow shutoff voltage can be attained with a much smaller control voltage. Alternatively, use of the same control voltage with the same toner enables the use of greater toner cloud densities thereby improving printing speed and reduced aperture fouling rate (i.e. greater wrong sign toner tolerance).

Curve 88 depicts the effect on the peak potential when the shield opening is increased to 5.6 mils while curve 90 depicts the effect on peak potential when the control electrode extends through an aperture configuration according to the embodiment depicted in FIG. 3. For curve 90, the shield radius is 5 mils while the control electrode extends through the 3 mil opening out to the radius of 4 mils.

As should be apparent, as the shield radius increases the control barrier voltage increases. However, the radius of the shield openings is limited because the isolation between neighboring apertures becomes less and less. resulting in crosstalk between apertures.

A way to further increase the barrier potential, without excessively increasing the shield radius is to continue the control electrode through the aperture as illustrated in FIG. 3. This results in the penetrating control electrode as mentioned above.

What is claimed is:

1. Apparatus for forming images including a toner delivery system, a printhead containing a plurality of apertures adapted to transport toner therethrough which toner is supplied by said delivery system to a vicinity of said apertures and means for supporting image receiving substrates for movement past said printhead, said supporting means being adapted to attract toner transported from said delivery system through said printhead whereby said toner is deposited in image configuration on said image receiving substrate, the improvement comprising:

a printhead structure having electrically biased control electrodes with openings therein and electrically biased shield electrode structure having openings therein, said control electrodes and shield electrode structure being secured to opposite sides of an insulative base member and said openings delineating said apertures; and said printhead structure being constructed such that said control electrodes have a greater influence on the barrier potential in said apertures than said shield electrode structure.

2. Apparatus according to claim 1 wherein said openings delineating said apertures are constructed such that the control electrodes exhibit a greater influence on the barrier potential in said apertures than said shield electrode structure.

3. Apparatus according to claim 2 wherein said openings are of different sizes, said printhead structure being positioned such that the larger of said openings are opposite said toner delivery system.

4. Apparatus according to claim 3 wherein an opening in said control electrode has a smaller radius than a corresponding opening in said shield electrode structure.

5. Apparatus according to claim 4 wherein said control electrodes extend through said apertures.

6. Apparatus according to claim 5 wherein said toner delivery system comprises insulative non-magnetic toner.

7. Apparatus according to claim 3 wherein said apertures are wedge-shaped.

8. Apparatus according to claim 3 wherein said control electrodes extend through said apertures.

9. Apparatus according to claim 5 wherein a portion of said control electrodes are coextensive with a part of the side of said base member to which said shield electrode structure is secured.

10. Apparatus for forming images including a toner delivery system, a printhead containing a plurality of apertures adapted to transport toner therethrough which toner is supplied by said delivery system to a vicinity of said apertures and means for supporting image receiving substrates for movement past said printhead, said supporting means being adapted to attract toner transported from said delivery system through said printhead whereby said toner is deposited in image configuration on said image receiving substrate, the improvement comprising:

a printhead structure having electrically biased control electrodes having openings therein and an electrically biased shield electrode structure having openings, said control electrodes and shield electrode structure being supported and separated by an insulative base member, said openings delineating said apertures, said openings in said control electrode being smaller than larger corresponding openings in said shield electrode with the larger openings being positioned opposite said toner delivery system.

11. Apparatus according to claim 10 wherein said apertures are wedge-shaped.

12. Apparatus according to claim 11 wherein said control electrodes extend through said apertures.

* * * * *